I. A. WEAVER.
CULTIVATOR.
APPLICATION FILED MAR. 28, 1910.
1,033,852.
Patented July 30, 1912.
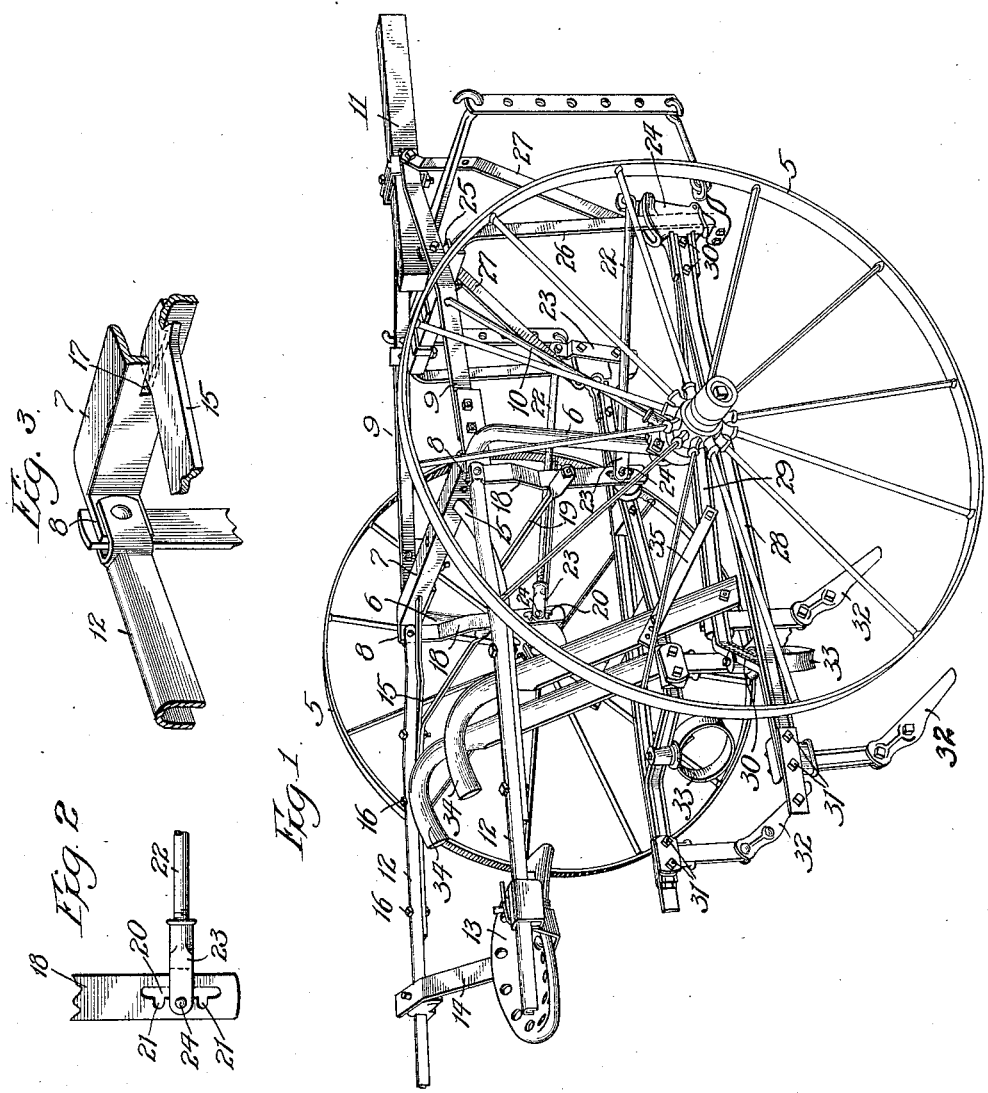

UNITED STATES PATENT OFFICE.

IRA A. WEAVER, OF SPRINGFIELD, ILLINOIS, ASSIGNOR TO RACINE-SATTLEY COMPANY, OF SPRINGFIELD, ILLINOIS, A CORPORATION OF ILLINOIS.

CULTIVATOR.

1,033,852.  Specification of Letters Patent.  Patented July 30, 1912.

Application filed March 28, 1910. Serial No. 551,907.

*To all whom it may concern:*

Be it known that I, IRA A. WEAVER, a citizen of the United States, residing at Springfield, in the county of Sangamon and State of Illinois, have invented certain new and useful Improvements in Cultivators, of which the following is a specification.

My invention relates to an improvement in cultivators, and has special reference to a body balance form of cultivator, in which the weight of the operator serves to raise and balance the shovel gangs.

In my improved cultivator a pair of seat bars are used, and between these bars is hung a seat. The bars are independently connected by suitable lever mechanism with pivoted members, to each of which is rigidly attached a beam or beams, on which the shovels forming a gang are supported. When the operator allows his whole weight to rest on the seat, the lever mechanism is effective in moving the fulcrum in such manner that the beams supporting the shovels are raised, and are held in a raised position as long as the operator remains on the seat. It will be apparent that the simplicity of this mechanism is a great advantage, inasmuch as the operator can raise and lower the beams supporting the shovels with a minimum of labor on his part. By shifting his weight toward one or the other of the seat bars the shovel beams may be independently controlled.

On account of the special construction of the hammock seat which I employ, the operator constantly has a good view of the work which is being performed. This is a point of considerable improvement over the prior art, inasmuch as it has been common to place the seat on a single bar, so that the view of the operator was obstructed to a considerable extent.

These and other advantages of my invention will be more apparent by reference to the accompanying drawings, which illustrate a preferred embodiment of my improved cultivator, and in which,—

Figure 1 is a perspective view of the cultivator; Fig. 2 is an enlarged side elevation view of the end of the brace attached to one of the seat bars, also showing the end of the link engaging said brace; and Fig. 3 is an enlarged perspective view showing the pivotal attachment between one of the seat bars and the main framework and the method of engaging the lateral brace for the seat bar with said framework.

Connected to the axles on which the wheels 5, 5 are mounted are the members 6, 6 rigidly attached to the angle iron 7 which forms part of the main framework of the cultivator. Each end of the angle iron 7 is bent in a backward direction, forming the projections 8, 8. Rigidly connected with the angle iron 7, by bolts or other similar means, are the forwardly extending frame members 9, 9, which are provided with braces 10 and are bolted to the pole 11. Pivotally attached to the backward extensions 8 of the angle iron 7 are the seat bars 12, 12, between which is hung the seat 13 supported on the transverse bar 14, it being evident that the ends of this bar are longitudinally movable on the seat bars 12, 12. A lateral brace 15 is rigidly attached on one end to each seat bar 12 by means of the bolts 16, and on its other end this brace engages an opening 17 in the angle iron 7. The opening 17 is made sufficiently large so that a small amount of space is left between the upper edge of the opening and the upper surface of the brace 15, thus allowing the brace to be moved in a vertical plane, for a purpose which will be explained hereafter.

Rigidly attached to the pivoted end of each seat bar 12 is the downwardly extending member 18, rigidly braced to the seat bar 12 by the bar 19. Near the lower end of each bar 18 is a slot 20, which has the notches 21. A link 22 has on one end the forked member 23, near the end of which is the pin 24 extending between the two tines of the fork. This pin 24 is adapted to engage one of the notches 21 connected with the slot 20. The other end of the link 22 is pivotally attached to the rod or bar 23', which is rigidly bolted to the inner side of the socketed fulcrum 24'.

Rigidly attached to the frame members 9 is the angle iron 25, to which are bolted, or otherwise suitably attached, downwardly extending rods 26, which thus form part of the main framework, each of these rods 26 being braced by the member 27. One of the two socketed fulcrums 24', 24' is pivotally attached to the lower end of each of the downwardly extending rods 26.

The shovel supporting beams 28 and 29 are joined at their ends by means of bolts 30, 30, and are also rigidly attached to the fulcrum 24'. It will be noted that the beams 28 and 29 are angularly disposed with relation to each other, the beam 28 being approximately straight and the beam 29 being bent near its rear end to form the portion 30 which extends back to the beam 28, to which it is connected by bolts 31. The beam 28 supports, near its rear end, a shovel 32, whereas the beam 29 supports a similar shovel 32 at the portion just in front of the angle which is formed by the main part 29 and the bent portion 30 of this beam. It will be clear from an examination of Fig. 1 that these shovel supporting beams 28 and 29 are similar on the two sides of the cultivator. Each portion 30 of the beam 29 is provided with the stirrups 33. Each of the beams 29 has bolted to it a handle 34, which is also braced by means of the rod 35.

Having thus described the general construction of my cultivator, its operation may now be readily understood.

When it is desired to lower the shovel gangs, the operator bears a considerable portion of his weight on the stirrups 33, 33, and the two gangs are held in their proper lateral position by means of the handles 34, 34. If the operator desires to raise the shovel gangs, he allows all of his weight to be supported on the seat 13, and at the same time may pull upwardly on the handles 34, 34. It will be clear that the weight of the operator acts on the seat bars 12, 12, and the downwardly extending bar 18 being rigidly braced to each of the seat bars, each link 22 is forced in a forward direction and tends to move the upper part of each fulcrum 24' forwardly, and the beams 28 and 29, which are rigidly attached to each fulcrum socket, are thereby raised. The weight of the operator on the seat 13 tends to hold the shovel gangs in their raised position.

The leverage action which is exerted on the two shovel gangs may be varied in either of two ways: first, the seat 13 may be adjusted in its longitudinal position on the seat bars 12; or the ends of the links 22 may be placed in different notches of the downwardly extending bars 18.

When the shovel gangs are in their raised position and the operator desires to lower them, it is, of course, only necessary for him to transfer a portion of his weight to the stirrups 33, 33, thus removing a corresponding amount of weight from the seat 13, and the shovel gangs will be lowered.

It is clear that not only may both of the shovel gangs be raised simultaneously, but an independent operation of the two gangs is also possible. This may be accomplished by an upward pull on one of the handles 34 by the operator, his weight at the same time being effective in aiding the upward movement of the shovel gang. In order to still further facilitate this independent action, he can, of course, place himself on the side of the seat toward which the shovel gang which it is desired to raise is located.

Many changes could be made in the detail construction of the cultivator which I have described without departing from the spirit of my invention.

What I claim as new and desire to cover by United States Letters Patent is:

1. In a cultivator, the combination of a main supporting frame, a pair of seat bars hinged to said frame, a hammock seat mounted on said bars and disposed between the same so that the operator may sit between said bars and shift his weight from one to the other, a pair of shovel beams rockingly mounted on said frame, shovels on said beams, and means independently connecting each of said bars and one of the beams, whereby by shifting his weight between said seat and either of said beams the operator may control the rise and descent of said beam and its shovels, substantially as described.

2. In a cultivator, the combination of a main supporting frame, a pair of seat bars hinged to said frame, a hammock seat mounted on said bars and disposed between the same so that the operator may sit between said bars and shift his weight toward one or the other, a pair of shovel beams rockingly mounted on said frame, shovels on said beams, means independently connecting each of said bars with one of said beams, and a stirrup on each of said beams, whereby by shifting his weight between said seat and stirrups the operator may control the rise and descent of each of the beams and its shovels independently, substantially as described.

3. In a cultivator, the combination of a main supporting frame, a seat bar pivotally attached to said frame, a shovel beam coupling fulcrum pivotally connected with the main frame, a member rigidly attached to said seat bar and angularly disposed with respect thereto, said member having a slot with a plurality of notches connected therewith, a link connecting said fulcrum with said angularly disposed member, said link being engaged with one of said notches to give the desired leverage on said fulcrum, and shovel supporting means rigidly attached to the fulcrum, depression of said seat bar causing the shovel supporting means to be raised, substantially as described.

IRA A. WEAVER.

Witnesses:
F. L. LUBY,
F. J. MARSHALL.

Copies of this patent may be obtained for five cents each, by addressing the "Commissioner of Patents, Washington, D. C."